(12) United States Patent
Sambandam et al.

(10) Patent No.: US 8,055,995 B2
(45) Date of Patent: Nov. 8, 2011

(54) SYSTEM AND METHOD OF DEFINING A HIERARCHICAL DATAMODEL AND RELATED COMPUTATION AND INSTRUCTION RULES USING SPREADSHEET LIKE USER INTERFACE

(75) Inventors: Suresh Sambandam, Chennai (IN); Manivanna Karthikeyan, Erode (IN); Prasanna Babu Jaganathan, Namakal (IN); Rajesh Manickadas, Chennai (IN); Dinesh Varadharajan, Chennai (IN)

(73) Assignee: OrangeScape Technologies Limited, Chennai (IN)

( * ) Notice: Subject to any disclaimer, the term of this patent is extended or adjusted under 35 U.S.C. 154(b) by 1096 days.

(21) Appl. No.: 11/885,896

(22) PCT Filed: Mar. 10, 2006

(86) PCT No.: PCT/IN2006/000085
§ 371 (c)(1),
(2), (4) Date: Sep. 7, 2007

(87) PCT Pub. No.: WO2006/095365
PCT Pub. Date: Sep. 14, 2006

(65) Prior Publication Data
US 2008/0256432 A1  Oct. 16, 2008

(30) Foreign Application Priority Data
Mar. 11, 2005  (IN) .............................. 244/CHE/2005

(51) Int. Cl.
*G06F 17/00* (2006.01)

(52) U.S. Cl. .......... 715/212; 715/217; 715/219; 715/220
(58) Field of Classification Search .................. 715/210, 715/212, 217, 219, 220, 213, 214
See application file for complete search history.

(56) References Cited

U.S. PATENT DOCUMENTS

| | | | | |
|---|---|---|---|---|
| 5,799,308 | A | * | 8/1998 | Dixon ........................... 707/812 |
| 5,893,123 | A | * | 4/1999 | Tuinenga ...................... 715/209 |
| 6,023,715 | A | * | 2/2000 | Burkes et al. .................. 715/207 |
| 6,199,078 | B1 | * | 3/2001 | Brittan et al. .................. 715/234 |
| 6,282,551 | B1 | * | 8/2001 | Anderson et al. .............. 715/209 |
| 6,286,017 | B1 | * | 9/2001 | Egilsson ........................ 715/207 |
| 6,378,001 | B1 | * | 4/2002 | Aditham et al. ............... 719/313 |
| 6,898,760 | B2 | * | 5/2005 | Bedford et al. ................ 715/205 |
| 7,415,664 | B2 | * | 8/2008 | Aureglia et al. ............... 715/212 |
| 7,487,437 | B2 | * | 2/2009 | Aureglia et al. ............... 715/212 |
| 7,617,444 | B2 | * | 11/2009 | Rothschillwe et al. ........ 715/213 |
| 7,752,536 | B2 | * | 7/2010 | Megiddo et al. ............... 715/216 |
| 2004/0103365 | A1 | * | 5/2004 | Cox ............................... 715/503 |
| 2004/0122844 | A1 | | 6/2004 | Malloy et al. .................. 707/102 |
| 2004/0148566 | A1 | * | 7/2004 | Jaffar et al. .................... 715/503 |
| 2004/0163050 | A1 | * | 8/2004 | Matter ........................... 715/530 |
| 2005/0034060 | A1 | | 2/2005 | Kotler et al. ................... 715/503 |
| 2005/0267853 | A1 | * | 12/2005 | Netz et al. ........................ 707/1 |
| 2006/0069993 | A1 | * | 3/2006 | Jones et al. ..................... 715/538 |
| 2006/0080595 | A1 | * | 4/2006 | Chavoustie et al. ........... 715/503 |
| 2006/0136433 | A1 | * | 6/2006 | Rothschiller et al. ......... 707/100 |
| 2006/0136827 | A1 | * | 6/2006 | Villaron et al. ................ 715/730 |

(Continued)

*Primary Examiner* — Thu Huynh
(74) *Attorney, Agent, or Firm* — Alix, Yale & Ristas, LLP

(57) ABSTRACT

The present invention relates to the field of information processing involving digital computers, embedded devices and more particularly, to a method and system for defining hierarchical data model and related computation and instructions rules using electronic spreadsheet like interface. The system and method of the invention are directed to user friendly, fast, development of multi-user, workflow enabled applications using spreadsheet as a tool for application modeling.

5 Claims, 4 Drawing Sheets

Meta Data Definition - 2

U.S. PATENT DOCUMENTS

| | | |
|---|---|---|
| 2006/0161844 A1* | 7/2006 | Simkhay et al. ............... 715/538 |
| 2007/0022128 A1* | 1/2007 | Rothschiller et al. ......... 707/100 |
| 2007/0220415 A1* | 9/2007 | Cheng et al. .................. 715/503 |
| 2009/0031206 A1* | 1/2009 | Aureglia et al. ............... 715/217 |
| 2009/0235154 A1* | 9/2009 | Khen et al. .................... 715/219 |
| 2011/0055681 A1* | 3/2011 | Smialek et al. ............... 715/219 |

* cited by examiner

Figure 1:
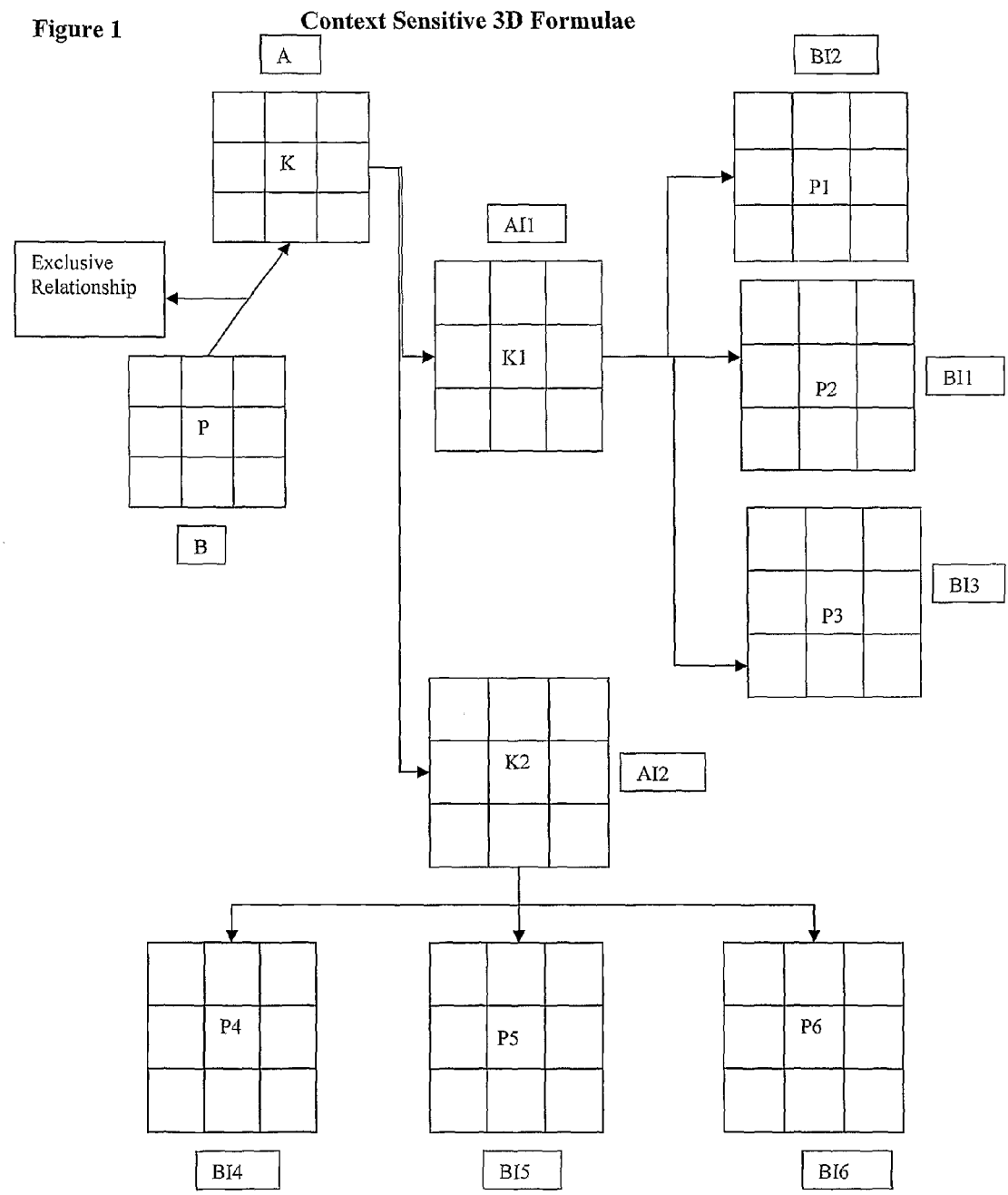

Figure 1 Context Sensitive 3D Formulae

Hierarchical Sheets

Meta Data Definition - 1

Sheet "INVOICE MASTER"

| | | | | | |
|---|---|---|---|---|---|
| | Name | No | Date | | |
| | PO No | PO Date | Cust ID | | |
| | | | | | |
| | | | | | |

Meta Data In Memory

```
Invoice Master

String   Name,
Integer  No,
Date     Date,
String   PO No,
Date     PO Date
String   Cust ID
```

Figure 5

Meta Data Definition - 2

| | | | |
|---|---|---|---|
| 1 | | | |
| 2 | 500 | 3 | |
| 3 | 8.3 | | |
| 4 | =B2*C2 | =B3*C3 | |
| 5 | =B4*C4 | | |

→ Public Input Parameter "Principle"

→ Input Public (parameter) "no of years"

→ Private Cell Constant

→ Private Intermediate Cells

→ Public Output Parameter "Simple Interest"

→ Public Parameter "rate of interest"

SYSTEM AND METHOD OF DEFINING A HIERARCHICAL DATAMODEL AND RELATED COMPUTATION AND INSTRUCTION RULES USING SPREADSHEET LIKE USER INTERFACE

FIELD OF THE INVENTION

The present invention relates to the field of information processing involving digital computers, embedded devices and more particularly, to a method and system for defining hierarchical data model and related computation and instructions rules using electronic spreadsheet like interface. The system and method of the invention are directed to user friendly, fast, development of multi-user, workflow enabled applications using spreadsheet as a tool for application modeling.

BACKGROUND ART

It is known in the art, building an business application involves a complex process of creating requirements document that include data model diagrams (using various notations) and elaborating the business rules in simple English like language which are to be understood by the application developers. There are various tools starting from word processors to advanced modeling tools like UML modelers which are usually available to achieve this task. After completing this process, the documentation is handed over to the developers for translating the data model and business rules into an application. The developers create classes or templates in programming languages like Java, C++, .Net, etc.

The classes created by these developers represent the metadata of the business model along with the code for the business rules. These classes are static definitions of how the model would behave in run-time. To see the actual working of these classes the developer compiles the classes to generate machine code and execute the classes. The classes can be tested only after the process of compilation (to intermediate code or target code) and execution. Developers go through this process of defining/modifying the classes, compiling and testing in an iteration to achieve the desired final output as described in the document. This existing approach demands a qualified software developer to translate a need into a working software program.

It is also known, that expert systems provide involving computer programs that could carry out reasoning tasks by applying the encoded knowledge inputs as "rules" or "frames" to facts concerning a problem provided by the end user.

The existing spreadsheet does not have a way to nest the sheets. Lack of nesting is a serious limitation in using the spreadsheets as a way to define data models. Spreadsheets described in the prior art also lack clear definition and support for 'Meta Data' i.e. data to describe data. Without 'Meta Data' interpretation of data becomes subjective and not explicit. Hence existing spreadsheets become unusable for defining business applications.

Also, any application is expected to go through multiple versions. With every new version comes along the problem of migrating the old model's data to the new model. This under the existing spreadsheet applications is often done as an offline data migration issue, which requires system downtime. Importantly, there is need for a method and system for maintaining historical changes done to a model against its previous version including such as the change of names, relationships and data types. Moreover, need is felt in the art for facilities for automatic migration utility (Change History) to migrate data from an earlier version of the model to the new version of the model.

Further the capability to selectively utilize part of an existing model in a new version by way of effective facilities to import sheets from one model to another is also found to be an and user requirement with formulas of the imported sheet to be reused in the linked mode.

Therefore, the above show that there exists a need for a new and innovative method for defining business applications using spreadsheet interface. The present invention is directed to meet such further need in spreadsheet like interface that would overcome problems encountered in existing conventional methods, including spread sheets used in defining business applications.

OBJECT OF THE INVENTION

It is thus the basic object of the present invention to provide a method of defining hierarchical data model and related computation adapted for rule engine based business applications using a spreadsheet like user interface which would solve the existing problem of semantic gap by adopting a rule engine approach which unlike other business rule engines would not require any proprietary language to function but advantageously utilizes the programming interface of the standard spreadsheets instead and thereby eliminating the need for the users to learn proprietary language for wide scale and diverse end user based applications of spreadsheets and the like.

Another object of the present invention is to avoid the limitation of possible nesting of sheets in conventional spreadsheets, which in turn causes serious limitations in using the spreadsheets as a way to define hierarchical data models.

Another object of the present invention is directed to provide clear definition and support for "Meta Data" in spreadsheets (without user intervention, i.e. implicitly ascertain data type) whereby interpretation of data in spreadsheets would not only be subjective and favor use of spreadsheets for defining business application.

Another object of the present invention is to enable multiple instances of the same virtual template to co-exist very similar to a class that has multiple instances in OOP, to enable 'Working with Data instead of Meta-Data', during application development.

Another object of the present invention is to avoid manual synchronization involving "Copy and Paste" option between one or more sheets of the spreadsheet requiring like changes such as formula modification or contact value changes. Avoiding the need to explicitly remember the changes in multiple instances of the template and provide means for automatically synchronizing meaningful cells across different spreadsheet instances of the same template Yet another object of the present invention is to provide a fully automated migration of data from an old model/version to a new model/version without involving or requiring offline data migration issue and user intervention, which requires system down time.

Yet further object of the present invention is directed to development of a method and system for efficient use of spreadsheet application involving defining a hierarchical data model and related computation and instruction rules using spreadsheet interface, which would favor more effective and user-friendly business application of spreadsheets.

Yet further object of the present invention is directed to incorporate and define "3-D" formula in spreadsheet like interface application that would automatically compute results based on the hierarchical context.

Yet another object of the present invention is to provide for analysis of inter-dependences and relationship between sheets and automatically computing the context sensitive 3-D formula to facilitate user-friendly business application of spreadsheet.

Yet another object of the present invention is directed to a method and system of defining a hierarchical data model and related computation and instruction, which would have the capability to automatically map (without user intervention) the underline structure of the virtual template to a database table.

Yet another object of the present invention is directed to a method and system of translating the relationships between the templates in the hierarchical data model to relational table relationships like Primary Key, Foreign Key constraints automatically without any user intervention.

Yet further object of the present invention is directed to a method and system called "Change History" adapted to maintain the changes done to a model against its previous version in spreadsheet like applications thereby favoring hot deployment of new models/versions without system down time and without invalidating old data created using old models/version.

Yet further object of the present invention is provide method and system of spreadsheet like user interface, which would enable support complex data types, which are created using two or more simple data types in a spreadsheet model.

Yet another object of the present invention is directed to a method and system for spreadsheet user interface wherein computation and function can be applied at complex data types, which are also used to store large amounts of look up information, which vary at runtime.

SUMMARY OF THE INVENTION

Thus according to the basic aspect of the present invention there is provided a method of defining a hierarchical data model and related computation using spreadsheet like interface comprising:
  nesting of various sheets in a spreadsheet by supporting a relationship between sheets in an internal data structure format.
  In the above method of the invention the relationships between sheets are maintained in an internal data structure adapted to hold information about every sheet and its relationship with other sheets. Thus the method involves providing and supporting multiple relationship types among the spreadsheets selected from shared relationship wherein a sheet is accessible/viewable from some other sheet or sheets with which it has shared relation and exclusive relationship wherein the sheets are exclusively accessed by the parent sheet alone. The shared relationship amongst the spreadsheets provide flexibility without sacrificing the integrity of the data model by enabling arrangement of relevant data to be closely located instead of having to access it using a full path to a deeply nested sheet.
  The method provides for both the GUI and engine level capabilities to support 'Meta Data' in a non-intrusive manner.

In accordance with a preferred aspect of the invention the method of defining a hierarchical data model and related computation using spreadsheet like interface comprising:

nesting of various sheets in a spreadsheet by supporting a relationship between sheets in an internal data structure format.
providing and supporting multiple relationship types among the spreadsheets selected from shared relationship wherein a sheet is accessible/viewable from some other sheet or sheets with which it has shared relation and exclusive relationship wherein the sheets are exclusively accessed by the parent sheet alone.
identifying and classifying cells selected from:
(i) Public Cells, which are interactive to the end user with the application and
(ii) Private Cells, which are internal to the sheet and need not be exposed to the end user;
providing said Public cells comprising:
(a) Input Cells wherein data is entered by the user, which become the starting point for computations and hold data that are typically unique every for sheet of the same template, said input cells also holding default values with which new sheets are initialized, that can be changed by the user; and
(b) Output Cells, which are formula cells that hold the results based on the computation that are linked to the input cells; and
providing said Private cells comprising:
(a) Constant Cells adapted to hold a fixed value for all sheet instances that belong to the same template; and
(b) Intermediate Cells, which are formulae cells that participate in intermediate computations but are not visible to the end user.

Following the above method of the invention it is possible to maintain the relationships between the sheets in its 'Meta Data' structure whereby by using the 'Meta Data' structure, it creates database table relationships.

Moreover, such method enables defining '3D formula' that will automatically compute based on the hierarchical context. Such '3D formula' comprising analyzing the interdependencies and the relationships between sheets and automatically computing the Context Sensitive '3D Formula'.

In accordance with another aspect of the invention the method provides for Dynamic Templates to recognize sheets of similar type and automatically synchronizes computation logic and constants across the sheets without any manual intervention.

The above dynamic template comprises effective functioning by associating a type with each sheet such that sheets that belong to the same type are grouped together and a change in any one of the sheets in the group is recognized, analyzed and objectively synchronized to other sheets in the group. Public cell data are not synchronized.

In accordance with yet another aspect the method of the invention is adapted to create Dynamic and Virtual Templates, templates are virtual build instead of explicitly defined templates inside its memory in a data structure by incrementally capturing unique user changes in a sheet.

According to another aspect the method of the invention comprises automatically mapping without user intervention the underlying structure of the virtual template to a database table. Such automatic mapping is achieved by automatically mapping the virtual template name to table name and the public cells are mapped to the field name, the private cells continue to be internal in the engine achieving seamless restoration.

Yet another aspect of the invention provides a method for maintaining 'Change History' which maintains the changes done to a model against its previous version. The 'Change History' records every change including the change of names, relationships and data types. Moreover, for providing automatic migration (Change History) to migrate data from an earlier version of the model to the new version of the model.

Advantageously, it is possible following the method of the invention to allow functionally different models to reuse part of its functionality via an 'import' capability wherein sheets from one model can be imported into another model and can be linked to one of its sheets which allows for the data model of the imported sheet to be reused in the linked mode. The imported sheet's virtual template maintains the integrity by managing the relationship with the sheets in the original model as well as the imported model.

The method of the invention thus enables supporting complex data-types, which are created using two or more simple data types in a spreadsheet model. In the above method computation and functions can be applied at complex data types, which is also used to store large amounts of lookup information that vary dynamically at runtime.

Thus the above invention is directed to take care of the required method and a system incorporating such method of defining hierarchical data model and related computation and instruction rules using spreadsheet like interface. Importantly, the method of the invention enable nesting of various sheets in a spreadsheet through the new system wherein nesting is achieved by supporting a relationship between sheets, which was not possible involving the conventionally available spreadsheet interface. Such relationship between sheets can be effectively and advantageously maintained in an internal data structure.

In particular, the invention provides and supports multiple relationship types among the spreadsheets, which favour achieving the possible nesting of various sheets in spreadsheet accordance with the invention. In a multiple relationship of sheets in the system and method of the invention if 'A', 'B' & 'C' are sheets in a model and if sheet 'C' is accessible from sheet 'A' and by 'B' then according to the system the sheet 'C' is in a shared relationship. In such state of 'C' vis-à-vis sheets 'A' & 'B', modification made to 'C' via anyone of the access point i.e. either 'A' or 'B' would be visible to the other because of the shared relationship. On the other hand, by way of an exclusive relationship in the system and method of the invention if 'A' & 'B' are two sheets and sheet 'B' is defined under sheet 'A' with exclusive relationship and then it is not accessible elsewhere in the model.

Such possible provision of shared and exclusive relationship among the spreadsheets provide for the desired flexibility without sacrificing the integrity of the data model by permitting the modeler to arrange relevant data to be closely located in stead of having to access it using a full path to a deeply nested sheet.

In accordance with the further aspect of the invention the same provides both the graphical user interface (GUI) and engine level capabilities to support meta data in a non-intrusive fashion using internal data structure.

Thus in accordance with a further aspect the invention provides for the desired system for defining a hierarchical data model and related computation using spreadsheet like interface comprising:
 (a) A memory in which are stored a plurality of machine instructions; and
 (b) A processor, coupled to the memory, for implementing a plurality of functions when executing the machine instructions stored in the memory, said plurality of functions selectively including:
  nesting of various sheets in a spreadsheet by supporting a relationship between sheets in an internal data structure adapted to hold information about every sheet and its relationship with other sheets;
  providing and supporting multiple relationship types among the spreadsheets selected from shared relationship wherein a sheet is accessible/viewable from some other sheet or sheets with which it has shared relation and exclusive relationship wherein the sheets are exclusively accessed by the parent sheet alone;
  support 'Meta Data' in a non-intrusive manner;
  identifying and classifying cells selected from (i) Public Cells, which are interactive to the end user with the application and (ii) Private Cells, which are internal to the sheet and need not be exposed to the end user;
  providing Dynamic Templates to recognize templates of similar type and automatically synchronizes computation logic and constants across the sheets without any manual intervention;
  creating Virtual Template inside its memory in a data structure by incrementally capturing unique user changes in a sheet;
  automatically mapping without user intervention the underlying structure of the virtual template to a database table;
  maintaining the relationships between the sheets in its 'Meta Data' structure whereby by using the 'Meta Data' structure, it creates database table relationships;
  defining '3D formula' comprises analyzing the interdependencies and the relationships between sheets that will automatically compute based on the hierarchical context;
  maintaining 'Change History' which maintains the changes done to a model against its previous version;
  Automatic migration (Change History) to migrate data from an earlier version of the model to the new version of the model;
  allowing functionally different models to reuse part of its functionality via an 'import' capability wherein sheets from one model can be imported into another model and can be linked to one of its sheets which allows for the data model of the imported sheet to be reused in the linked mode;
  supporting complex data-types which are created using two or more simple data types in a spreadsheet model; and
  computation and functions applied at complex data types which is also used to store large amounts of lookup information which vary at runtime In accordance with another aspect the system of the invention is adapted to identify and classify (I) said Public cells comprising:
 (a) Input Cells wherein data is entered by the user, which become the starting point for computations and hold data that are typically unique every for sheet of the same template, said input cells also holding default values with which new sheets are initialized, that can be changed by the user; and
 (b) Output Cells, which are formula cells that hold the results based on the computation that are linked to the input cells; and
(II) said Private cells comprising:
 (a) Constant Cells adapted to hold a fixed value for all sheet instances that belong to the same template; and
 (b) Intermediate Cells, which are formulae cells that participate in intermediate computations but are not visible to the end user.

It would be apparent from the above method and system of the invention that the same advantageously utilizes a selective identification and classification of cells to impart desired flexibility and versatility to the spreadsheet. In particular, the cells are classified as public and private cells to enable and/or prohibit the user interaction with the respective cells and in a way provide for a new method and system for accessing the cells of spreadsheets in a more appropriate and selective manner to facilitate variety of business application and user requirements and utilities.

In accordance with a further aspect the system of the invention, by way of the afore-discussed inter-dependency and relationship between sheets provided there under define 3-D formula adapted to automatically compute based on the hierarchical contact.

The above system thus, maintains the relationship between the sheets in its meta-data structure and utilizing such meta-data structure it also facilitates creating database table relationship.

The system is further adapted to maintain "CHANGE HISTORY", which is the record of the changes done to a model against its previous version. Such change history further records every change including the change of names, relationships and data types. Importantly, the system is also adapted for automatic migration utility (change history) to migrate data from an earlier version of a model to the new version the model.

According to yet further aspect, the new system allows functionally different models to reuse part of its functionality via an import capability wherein sheets from one model can be imported into another model and can be linked to one of its sheets, which allows for the data model for the imported sheet to be reused to the linked model. Importantly, the imported sheet virtual template maintains the integrity by managing the relationship with the sheets in the original model as well as the imported model.

It is thus possible utilizing the method and system to support complex data types, which are created using two or more simple data types in a spreadsheet model. The computation and function can be applied at complex data types, which is also used to store large amount of look up information, which vary at runtime.

According to another aspect of the invention there is provided a server application comprising:
hierarchical data model and related computation involving spreadsheet like interface providing:
  nesting of various sheets in a spreadsheet by supporting a relationship between sheets in an internal data structure format.
  providing and supporting multiple relationship types among the spreadsheets selected from shared relationship wherein a sheet is accessible/viewable from some other sheet or sheets with which it has shared relation and exclusive relationship wherein the sheets are exclusively accessed by the parent sheet alone.
  identifying and classifying cells selected from:
    (i) Public Cells, which are interactive to the end user with the application and
    (ii) Private Cells, which are internal to the sheet and need not be exposed to the end user;
  providing said Public cells comprising:
    (a) Input Cells wherein data is entered by the user, which become the starting point for computations and hold data that are typically unique every for sheet of the same template, said input cells also holding default values with which new sheets are initialized, that can be changed by the user; and
    (b) Output Cells, which are formula cells that hold the results based on the computation that are linked to the input cells; and
  providing said Private cells comprising:
    (a) Constant Cells adapted to hold a fixed value for all sheet instances that belong to the same template; and
    (b) Intermediate Cells, which are formulae cells that participate in intermediate computations but are not visible to the end user;
said server application adapted for access to said hierarchical data model and related computation by plurality of users.

In accordance with yet further aspect of the present invention there is thus provided a computer-readable medium having computer-executable instructions for performing nesting of various sheets in a spreadsheet by supporting a relationship between sheets in an internal data structure format wherein the relationships between sheets are maintained in an internal data structure adapted to hold information about every sheet and its relationship with other sheets.

Such a computer-readable medium having computer-executable instructions is obtained for providing and supporting defining a hierarchical data model and related computation using spreadsheet like interface for carrying out the above method of this invention.

A general purpose computing device in the form of a conventional personal computer, including a processing unit, a system memory, and a bus means that couples various system components including the system memory to processing unit can be used to practice the invention. The invention as above can be also practiced in distributed computing environments where tasks are performed by remote processing devices that are linked through a communications network. In a distributed computing environment, program modules may be located in both local and remote memory storage devices.

BRIEF DESCRIPTION OF THE ACCOMPANYING FIGURES

The manner in which the features, advantages and objects of the invention, as well as others will become apparent and can be understood in more detail, more particular of the description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it may admit to other equally effective embodiments.

Figure 2:
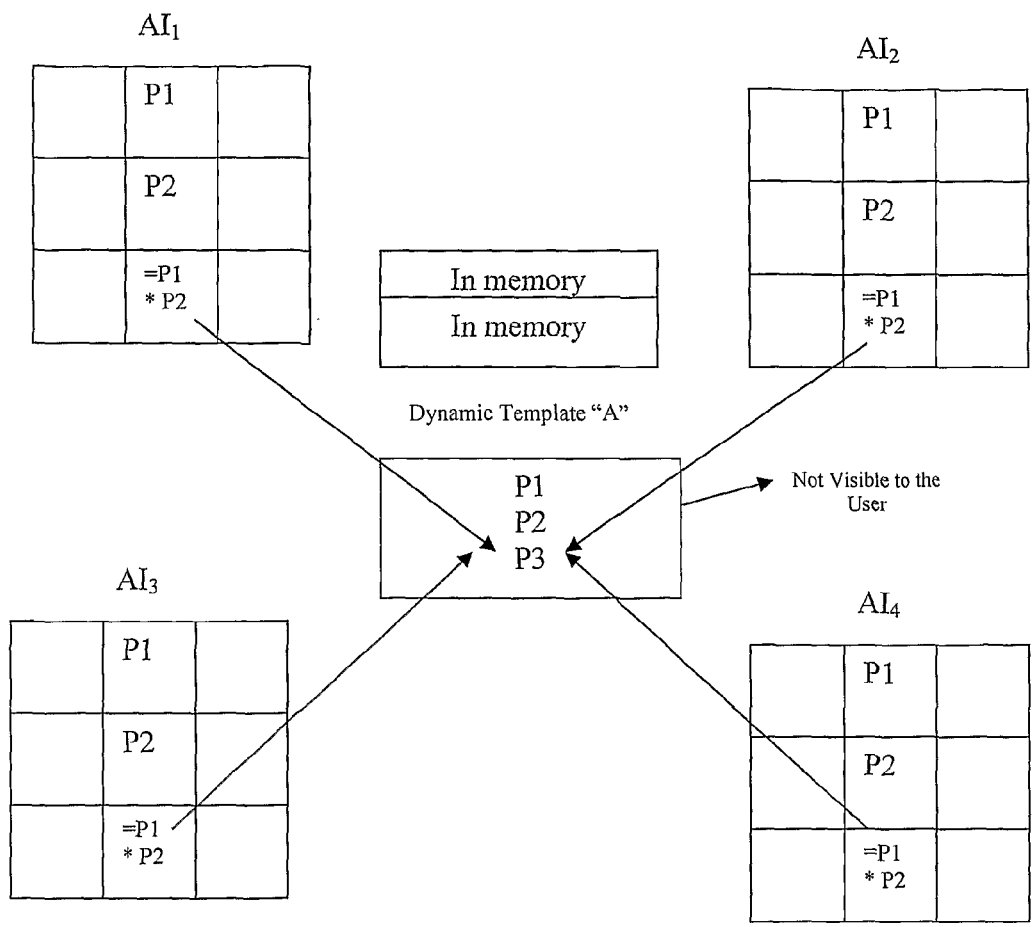
Figures 3, 4:
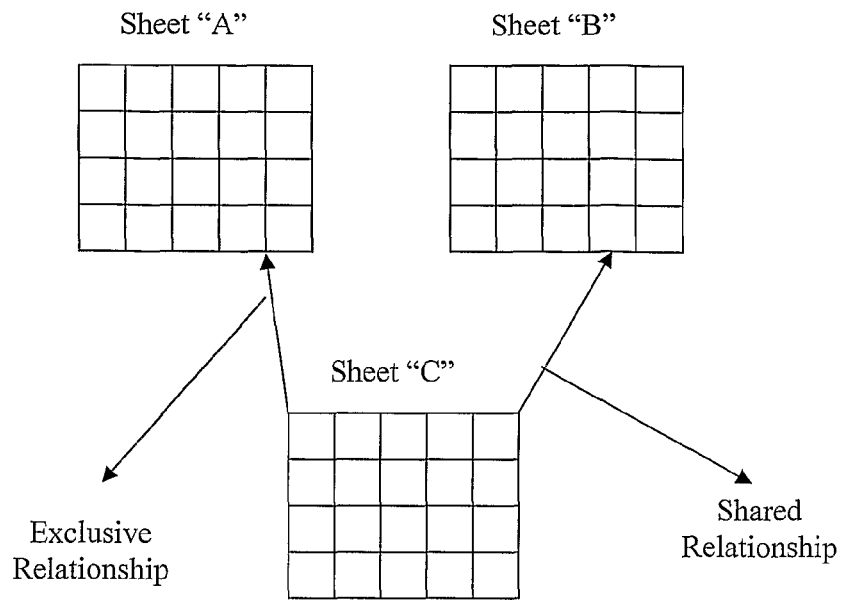

FIG. 1: Illustrates the context sensitive 3-D formula provided in the system of the invention;

FIG. 2: depicts the provision of dynamic and virtual templates in accordance with the system of the invention;

FIG. 3: Illustrates the provision of hierarchical sheets in the system of the invention;

FIGS. 4 & 5: Illustrate the manner of meta-data definition used by the present system.

Reference is first invited to accompanying FIG. 1, which represents the context sensitive 3-D formula defined under the method and system of the present system. As represented in the figure, the 3-D formula involves K=sum of P of sheet B, which translates to A11 of K1=P1+P2+P3 of B11, B12 & B13 and A12 of K2=P4+P5+P6 of B14, B15 & B16.

It would be apparent from the above that the present invention provides the ability to define 3-D formula that automatically computes based on the hierarchical context. The following is an illustration of such automatic computation based on hierarchical context provided by the system of the invention.

Thus the present invention provides the ability to define '3D formula' that automatically computes based on the hierarchical context. Let us say that "A", "B" and "C" are 3 sheets are under sheet "M" and "D", "E" and "F" are 3 other sheets under sheet "N". Both sheet "M" and "N" belong to the same type say "T1". Sheets A to F belong to the type "T2". Let us define a parameter by name "P1" in any of the sheets of type "T1". Let us define a parameter "P2" in any of the sheets of the type "T". Now, it is possible to write a 3D-Formula like M·T1=sum (A·P1 to C·P1). HCE automatically writes a 3D-Formula like N·T1=sum (D·P1 to F·P1). This is achieved by analyzing the interdependencies and the relationships between sheets and automatically arriving at the Context Sensitive '3D Formula'.

Reference is now invited to accompanying FIG. 2, which illustrates the dynamic and virtual template in accordance with the invention. Existing spreadsheets are known to have support for static templates. By virtue of such static templates in existing spreadsheet it is possible to apply the same template to one or more sheets say sheet "A" and "B" in a spreadsheet. However, in use of such static templates, the changes like a formula modification done in sheet A is not automatically synchronized to sheet B and vis-à-vis. The user has to manually make the synchronization by copy and paste option. Such a manual option is obviously error prone, inefficient and quite frustrating. On the other hand the system of the present invention is adapted to avoid such limitation of static templates by provision of dynamic templates. Dynamic template is adapted to recognize templates of similar type and automatically synchronized computation logic across the sheet without any manual intervention. This is possible by associating a type with each sheet. Sheets that belong to the same type are grouped together and a change in any one of the sheets in the group is recognized and synchronized to other sheets in the group.

Existing spreadsheets software requires templates to be defined explicitly. The templates are physically created and maintained separately and the sheets that are using the templates are maintained separated. This causes maintenance draw backs for the user maintaining the spreadsheet model. The user has to explicitly remember to make changes in the template to incorporate a common functionality, for example a formulae. This invention overcomes this limitation by providing 'Virtual Template' by eliminating the need to create 'Physical Templates'. Wherein the templates are build virtually inside its memory in a proprietary data structure, by incrementally capturing unique user changes in a sheet. The template is not physically visible to the user.

Reference is now invited to accompanying FIG. 3, which illustrates hierarchical sheets in accordance with the invention. Presently available spreadsheet software does not support the desired nesting of sheets. Lack of nesting is a serious limitation in using spreadsheet as a way to define data model. Typically, any application would require a data model that is hierarchical and the present invention provide the nesting of sheets utilizing such hierarchical data model.

Importantly, the nesting is achieved by supporting a relation between sheets, which is developed by way of the invention and maintain in an internal data structure. Importantly, the data structure supports information about every sheet and its relationship with other sheets. Thus the present invention supports multiple relationship types when relating two sheets as further explained hereunder:

Exclusive Relationship: If "A" and "B" are two sheets and sheet 'B' is defined under sheet 'A' with "Exclusive" relationship then it is not accessible else where in the model Shared Relationship: If "A", "B" and "C" as sheets in a model and if sheet "C" is accessible from sheet "A" and by "B" then it is said to have "Shared" relationship. Modifications made to "C" via any one of the accesses point i.e. either "A" or "B" is visible to the other because of the "Shared" relationship. The concept of sharing also provides flexibility from a modeling perspective without sacrificing the integrity of the data model. It helps the modeler to arrange relevant data to be closely located instead of having to access it using a full path to a deeply nested sheet.

Reference is now invited to accompanying FIGS. 4 & 5, which illustrate meta-data definition. It is known that the existing spreadsheets work with data and lack a clear definition and support for meta-data that is data to describe the data. Thus without such meta-data interpretation, the data becomes subjective and not explicit. Therefore, existing spreadsheets become unusable for defining business application. The present invention therefore further overcomes this limitations by providing both graphical user interface (GUI) and engine level capabilities to support "Meta Data" in a non-intrusive fashion. This is achievable by identifying the cells by way of the discussed classifications of cells by way of (I) Public Cells comprising (a) Input Cells and (b) Output Cells and (II) Private Cells comprising (a) Constant Cells and (b) Intermediate Cells.

It is thus possible by way of the above invention to provide the much desired method and system in an electronics spreadsheet for defining hierarchical data model and related computation and instructions rules using spreadsheet like interface. The system and method of the invention would be user friendly and enable fast application and use of spreadsheet as a successful analytical tool for data processing and analyzing.

It would be apparent from the foregoing illustrative embodiment that the invention is not intended or construed to limit to the details of the foregoing illustrating embodiments and the present invention can be embodied in other specific forms by way of adaptations, variations, modification and equivalent arrangements and the scope of the invention should be construed based on the appended claims and equivalents thereof rather than by the foregoing illustrative embodiments and all changes, which come within the range of equivalency of the claims are therefore intended to be embraced therein.

We claim:

1. A system for defining a hierarchical data model and related computation using a spreadsheet like interface comprising:
   a) a memory in which are stored a plurality of machine instructions; and
   (b) a processor, coupled to the memory, for implementing a plurality of functions when executing the machine instructions stored in the memory, said plurality of functions selectively including:
   nesting of various sheets in a spreadsheet by supporting a relationship between sheets in an internal data structure adapted to hold information about every sheet and its relationship with other sheets;
   providing and supporting multiple relationship types among the sheets, said relationship types selected from a shared relationship wherein a sheet is accessible/viewable from another sheet or sheets with which it has a shared relation, and an exclusive relationship wherein the sheets are exclusively accessed by a parent sheet alone;
   supporting 'Meta-Data' in a non-intrusive manner;

identifying and classifying cells in the sheets of the spreadsheet selected from:
(i) public cells, which are interactive to an end user with the system and
(ii) private cells, which are internal to the sheet and need not be exposed to the end user;
providing dynamic templates to recognize templates of similar type and automatically synchronizes computation logic and constants across the sheets without any manual intervention;
creating a virtual template inside said data structure by incrementally capturing unique user changes in a sheet;
automatically mapping without user intervention the underlying structure of the virtual template to a database table;
maintaining the relationships between the sheets in a 'Meta Data' structure and using the 'Meta Data' structure to create database table relationships;
defining a '3D formula' comprising analyzing interdependencies and relationships between sheets that will automatically compute based on a hierarchical context;
maintaining a 'Change History' which maintains changes done to a hierarchical data model against its previous version;
automatic migration (Change History) to migrate data from an earlier version of the hierarchical data model to a new version of the hierarchical data model;
allowing functionally different models to reuse functionality via an 'import' capability wherein sheets from one hierarchical data model can be imported into and can be linked to at least one of the sheets in another hierarchical data which allows for the formulas of the imported sheets to be reused in a linked mode;
supporting complex data-types which are created using two or more simple data types in a spreadsheet model; and
computation and functions applied to complex data types which are also used to store large amounts of lookup information which vary at runtime.

2. A system according to claim 1 adapted to identify and classify said public cells comprising:
(a) input cells wherein data is entered by the user, which become a starting point for computations and hold data that are typically unique for every sheet of a common template, said input cells also holding default values with which new sheets are initialized, that can be changed by the user; and
(b) output cells, which are formula cells that hold the results based on the computations that are linked to the input cells.

3. A system according to claim 2 comprising identifying and classifying said private cells comprising:
(a) constant cells adapted to hold a fixed value for all sheet instances that belong to the common template; and
(b) intermediate cells, which are formulae cells that participate in intermediate computations but are not visible to the end user.

4. A system for defining a hierarchical data model and related computation using spreadsheet like interface as claimed in claim 1 adapted for single or multiple user access to said hierarchical data model and related computation.

5. A server application comprising computer executable instructions stored in a computer readable medium associated with a server and executed on one or more processors in the server comprising:
constructing a hierarchical data model and related computation involving spreadsheet like interface comprising:
nesting of various sheets in a spreadsheet by supporting a relationship between sheets in an internal data structure format;
providing and supporting multiple relationship types among the sheets selected from a shared relationship wherein a sheet is accessible/viewable from another sheet or sheets with which it has shared relation and an exclusive relationship wherein the sheets are exclusively accessed by a parent sheet alone;
identifying and classifying cells in the sheets of the spreadsheet selected from:
(i) public cells, which are interactive to an end user with the application and
(ii) private cells, which are internal to the sheet and need not be exposed to the end user;
providing said public cells comprising:
(a) input cells wherein data is entered by the end user, which become a starting point for computations and hold data that are typically unique for every sheet of a common template, said input cells also holding default values with which new sheets are initialized, that can be changed by the end user; and
(b) output cells, which are formula cells that hold results based on the computations that are linked to the input cells; and
providing said private cells comprising:
(a) constant cells adapted to hold a fixed value for all sheet instances that belong to the common template; and
(b) intermediate cells, which are formulae cells that participate in intermediate computations but are not visible to the end user;
said server application adapted for access to said hierarchical data model and related computation by plurality of users.

* * * * *